Nov. 8, 1960     P. S. JORGENSEN     2,959,059
GYRO SUSPENSION
Filed May 28, 1959

INVENTOR.
PAUL S. JORGENSON
BY
ATTORNEY.

United States Patent Office 2,959,059
Patented Nov. 8, 1960

2,959,059

GYRO SUSPENSION

Paul S. Jorgensen, Westbury, N.Y., assignor to American Bosch Arma Corporation, a corporation of New York Filed May 28, 1959, Ser. No. 816,625

6 Claims. (Cl. 74—5.0)

The present invention relates to gyroscopic devices and has particular reference to suspension devices for fluid suspended, two-degree of freedom gyros.

In fluid suspended gyros, the gyro wheel is encased in a float assembly which in turn is completely submerged in a fluid inside a tank. Ideally, the float is exactly at neutral buoyancy. However, because of practical limitations some buoyancy error will exist and means must be provided to take up the net weight of the float in the fluid and maintain it centered within the tank. Typical of these gyros are the ones described in U.S. Patents 2,677,194 for Gyrocompass and 2,742,299 for Gyroscope Suspension and a copending patent application, Serial No. 479,144, filed December 31, 1954.

The centering suspension provided by the present invention includes four wires stretched between the float and the tank in the form of a diamond in which opposite apices are attached to the tank and to the float. A significant feature of this invention is the location of the ends of the wires at the points of attachment to the float and tank. It is important to attach the wires at opposite sides of the tank, i.e., the top and bottom of the tank, so that the points of attachment of the two wires at each of these locations are very close together. Similarly, the points of attachment of the two wires at opposite sides of the float should be very close together.

The present invention provides two degrees of freedom without requiring an intermediate gimbal ring, thereby eliminating the adjustments and balancing usually required for the gimbal rings, resulting in an electrically and mechanically simpler gyro. By virtue of the location of the wires ends, the float is very compliant to rotation about the axes perpendicular to the gyro spin axis thereby minimizing spurious torques from the centering arrangement, yet the float is rigidly constrained to prevent rotation about the spin axis and translation along axes perpendicular to the gyro spin axis.

The geometry of the centering wires is such that the float will assume a position relative to the tank so that the tension in all four wires is exactly equal when the float is at neutral buoyancy. When not exactly at neutral buoyancy, differential tensions provide the required centering forces.

For a more complete understanding of the invention, reference may be had to the accompanying figures, in which.

Figure 1:
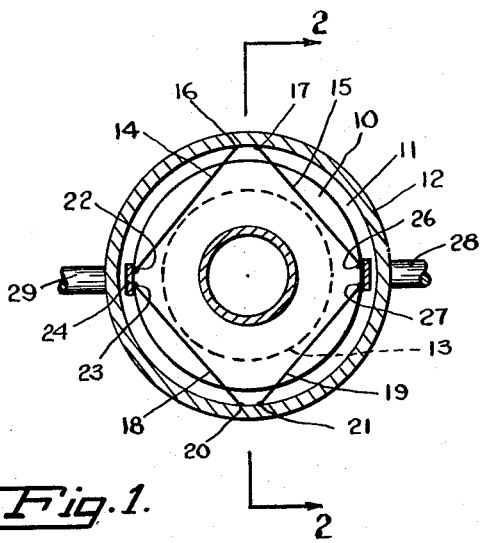
Fig. 1 is a sectional view through the plane 1—1 of Fig. 2.
Figure 2:
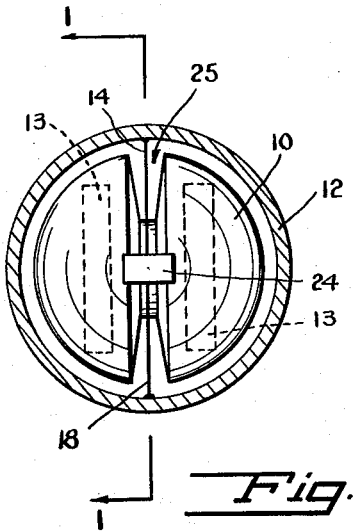
Fig. 2 is a partial sectional view with the cutting plane passing through 2—2 of Fig. 1.
Figure 3:
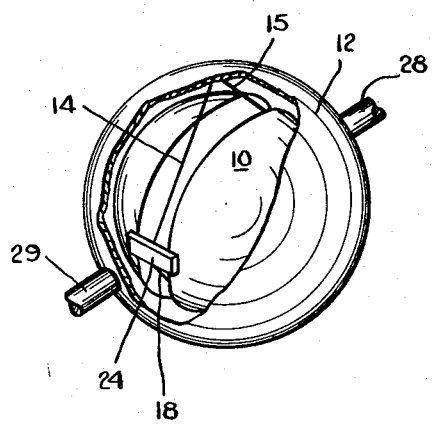
Fig. 3 is a pictorial representation of the invention.

Referring now to the figures, a float 10 is suspended in substantial neutral buoyancy in a fluid 11 which fills the space between float 10 and the tank 12. The float 11 contains gyro wheels 13 and motive means therefor, and may be similar to that shown in the copending application Serial No. 479,144, for example.

A pair of wires 14, 15 are attached to the inner wall of tank 12 at the points 16, 17 and a second pair of wires 18, 19 are attached to the tank 12 at the points 20, 21 which are diametrically opposite points 16, 17. The points 16, 17 are very close to each other, as are points 20, 21.

The other ends of wires 14 and 18 are attached to the float 10 at points 22, 23 on the opposite edges of a bar-like member 24 which spans the equatorial channel 25 in the ball-like float 10. Similarly, the wires 15 and 19 are attached to the float 10 at points 26, 27 diametrically opposite the points 22, 23.

Although the float 10 is shown in the form of a ball with an equatorial channel which provides clearance for the wires 14, 15, 18 and 19, other geometrical shapes of the float may be used equally well for the purposes of this invention, providing that care is taken to prevent contact between the wires and the float 10 along the length of the wires 14, 15, 18 and 19.

It will be seen that the present invention provides limited freedom of rotation of the float 10 with respect to the tank 12 about the substantially orthogonal axes defined by the points 16, 17, 20, 21 and the points 22, 23, 26 and 27.

The wires 14, 15, 18 and 19 are attached to the tank and float by conventional means not detailed here, since the means of attachment does not materially affect the operation of the invention. Such means may include welding or clamping, for example, and may further include tension adjusting means if found to be desirable or necessary.

It should be emphasized that the points of attachment of the wires to the tank and float must be very close together so that the torsional forces about the rotational axes are not excessive during relative displacements of the tank and float. The torsional reaction is employed for applying precessing torques to the gyro in the manner of the prior patents and applications.

It should be noted further than only that much of the gyro which is effected by the present improvement is described herein. It must be realized that an outer gimbal system supports the tank 12 about the shafts 28 and 29, for example, and pickoff devices and follow-up motors are provided as required.

I claim:

1. In a device of the character described, a gyro casing, a tank, a fluid suspending said gyro casing in said tank, a first pair of centering members having their adjacent ends connected to the casing and their other ends connected at substantially diametric opposite points to said tank and a second pair of centering members having their adjacent ends connected to said casing diametrically opposite the connection of said first pair of members to said casing, said second pair of centering members having their other ends connected to said tank adjacent the connection of the ends of said first pair of centering members to said tank, said centering members forming substantially a diamond shaped configuration.

2. In a device of the character described, a gyro casing, a tank, a fluid suspending said gyro casing in said tank, a first pair of centering members having their adjacent ends connected to the casing and their other ends connected at substantially diametric opposite points to said tank and a second pair of centering members having their adjacent ends connected to said casing diametrically opposite the connection of said first pair of members to said casing, said second pair of centering members having their other ends connected to said tank adjacent the connection of the ends of said first pair of centering members to said tank, said centering members forming substantially a diamond shaped configuration, said casing having a throat with said centering members in said throat thereby preventing contact between said casing and said centering members.

3. In a device of the character described, a gyro casing, a tank, a fluid suspending said gyro casing in said tank, a first pair of centering members having their adjacent end connected to the casing and their other ends connected at substantially diametric opposite points to said tank and a second pair of centering members having their adjacent ends connected to said casing diametrically opposite the connection of said first pair of members to said casing, said second pair of centering members having their other ends connected to said tank adjacent the connection of the ends of said first pair of centering members to said tank, said centering members extending in a straight line between their points of connection with said tank and said casing.

4. In a device of the character described, a gyro casing, a tank, a fluid suspending said gyro casing in said tank, a first pair of centering members having their adjacent ends connected to the casing and their other ends connected at substantially diametric opposite points to said tank and a second pair of centering members having their adjacent ends connected to said casing diametrically opposite the connection of said first pair of members to said casing, said second pair of centering members having their other ends connected to said tank adjacent the connection of the ends of said first pair of centering members to said tank, said centering members extending in a straight line between their points of connection with said tank and said casing, said casing having a throat with said centering members in said throat thereby preventing contact between said casing and said centering members.

5. In a device of the character described, a gyro casing, a tank, a fluid suspending said gyro casing in said tank, a first pair of centering members having their adjacent ends connected to the casing and their other ends connected at substantially diametric opposite points to said tank and a second pair of centering members having their adjacent ends connected to said casing diametrically opposite the connection of said first pair of members to said casing, said second pair of centering members having their other ends connected to said tank adjacent the connection of the ends of said first pair of centering members to said tank, said centering members forming substantially a diamond shaped configuration, whereby a line connecting said diametrically opposed points of connection on said tank is perpendicular to a line connecting said diametrically opposed points of connection on said casing.

6. In a device of the character described, a gyro casing, a tank, a fluid suspending said gyro casing in said tank, a first pair of centering members having their adjacent ends connected to the casing and their other ends connected at substantially diametric opposite points to said tank and a second pair of centering members having their adjacent ends connected to said casing diametrically opposite the connection of said first pair of members to said casing, said second pair of centering members having their other ends connected to said tank adjacent the connection of the ends of said first pair of centering members to said tank, said centering members extending in a straight line between their points of connection with said tank and said casing, whereby a line connecting said diametrically opposed points of connection on said tank is perpendicular to a line connecting said diametrically opposed points of connection on said casing.

References Cited in the file of this patent
UNITED STATES PATENTS

| | | |
|---|---|---|
| 2,740,299 | Jewell | Apr. 3, 1956 |
| 2,746,301 | Henderson | May 22, 1956 |
| 2,757,050 | Weber et al. | July 31, 1956 |
| 2,896,455 | Bishop et al. | July 28, 1959 |